Feb. 16, 1971     E. L. RADER     3,563,099
SEALED DRIVE SYSTEM
Filed Feb. 24, 1969
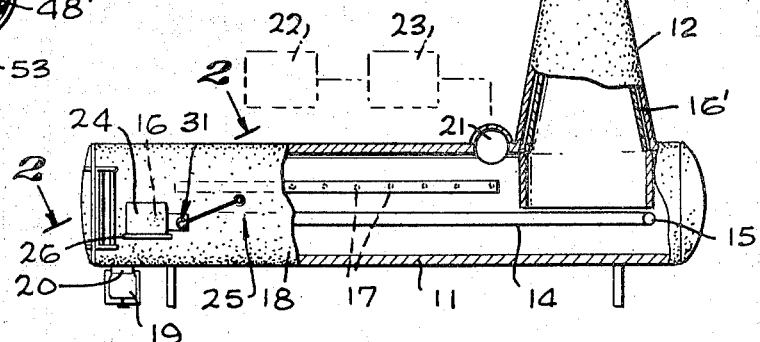
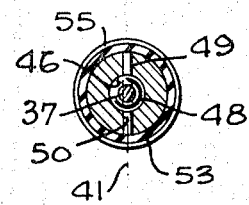
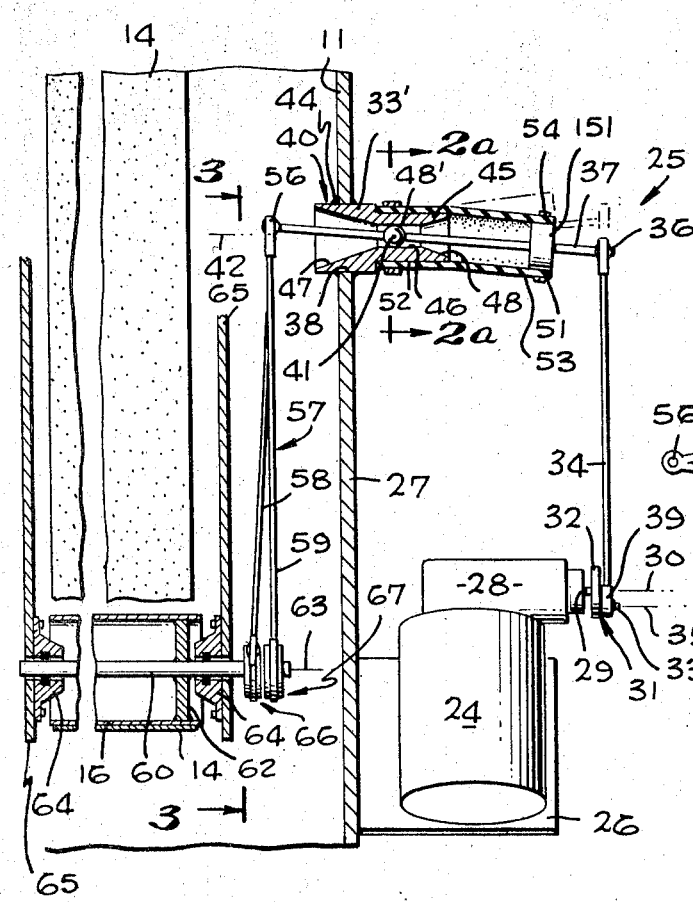
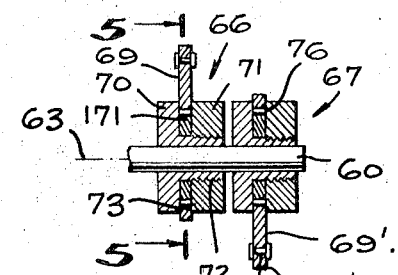
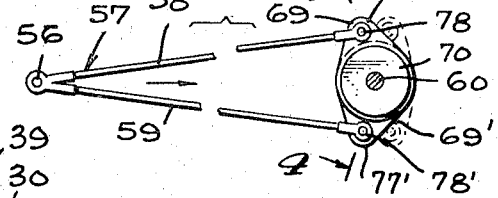
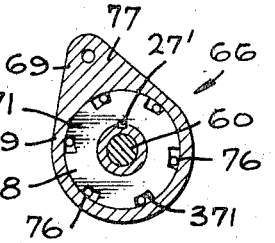
INVENTOR.
EARL L. RADER
BY William P. Green
ATTORNEY

United States Patent Office 3,563,099
Patented Feb. 16, 1971

3,563,099
SEALED DRIVE SYSTEM
Earl L. Rader, 154 W. Providencia,
Burbank, Calif. 91502
Filed Feb. 24, 1969, Ser. No. 801,411
Int. Cl. F16j 15/50
U.S. Cl. 74—18.1
14 Claims

ABSTRACT OF THE DISCLOSURE

A drive system by which a rotary motor at one side of a wall structure may drive a rotary element at the opposite side of the wall structure, with the wall being completely sealed and fluid tight at the location of the drive. The drive arrangement includes a lever extending through an opening in the wall structure and mounted for oscillatory pivotal movement, and sealed with respect to the wall, with opposite ends of the lever connected operatively to a motor driven rotary element at one side of the wall and the second rotary element. The latter may be driven by the oscillatory pivotal lever through two one-way clutch drives which become operable alternately to turn the driven element substantially continuously.

CROSS REFERENCE TO RELATED APPLICATION

The drive system of the present invention is in certain respects especially useful for driving an element such as the conveyor belt utilized in the freeze drying apparatus disclosed and claimed in my copending application Ser. No. 801,411, filed of even date herewith on "Apparatus and Process for Producing Freeze Dried Products."

BACKGROUND OF THE INVENTION

This invention relates generally to improved powered drive systems for transmitting power from a rotary motor to a driven rotary element, preferably in an installation in which a fluid tight seal is to be maintained between the motor and the driven structure.

In my above identified copending application, I have disclosed a freeze drying unit including an endless conveyor belt contained within a vacuum chamber for slowly advancing frozen particles of a work substance through a drying region, to sublimate moisture from those particles. In apparatus of this type, which is maintained at a very high vacuum for maximizing the freeze drying effectiveness, it is highly desirable if not imperative that the driving motor be located at the outside of the vacuum chamber, for several reasons. In the first place, if the motor were located within the vacuum chamber, the high vacuum condition would very rapidly cause evaporation of all lubricant from the motor bearings, and would similarly adversely affect any rubber or plastic sealing elements, insulation, and the like, in a manner drastically shortening the operational life of the motor. Any evaporated substances might also adversely affect the composition of the ultimate freeze dried product, and the enclosed condition of the motor would also render difficult control of the motor temperature.

If, on the other hand, the motor is located at the outside of the vacuum chamber, it is then extremely difficult to provide a drive connection through the wall of the chamber without at the same time introducing the danger of fluid leakage between opposite sides of the wall at the drive location. Though numerous different types of seals for rotary drive shafts have been developed in the past, I know of none which is really effective and reliable for a vacuum condition such as that discussed above, since the rotary seal elements regardless of their composition and configuration tend to ultimately be affected by the high vacuum condition of the freeze drying operation. The slightest leak in a vacuum system can of course completely destroy the effectiveness of the system for its intended purpose.

SUMMARY OF THE INVENTION

A drive system embodying the present invention is capable of transmitting power from a rotary motor at one side of a wall structure to a rotary element at the opposite side of the wall structure, with a completely and permanently effective positive fluid tight seal being provided at the location at which the drive passes through the wall. To attain this result, the power is converted to a nonrotary form at the location of the wall, and more specifically is transmitted through an oscillatory pivotal lever, which is connected at a first side of the wall to the rotary motor to oscillate pivotally in correspondence with the rotation of the motor, and is connected at the opposite side of the wall to a rotary output element, such as a roller for driving the previously mentioned belt of my freeze drying apparatus. The pivotal lever may then be sealed to the wall very effectively, desirably by a flexible tubular seal element whose opposite ends are tightly clamped to the wall and lever respectively, in a manner avoiding the necessity for relative rotation between any of the sealed parts.

Certain additional features of the invention relate to an arrangement for converting oscillatory to rotary motion, which mechanism may be utilized as the drive connection at the second side of the wall structure discussed above, or more broadly may be applied in its most general aspects to other power conversion situations. The invention will be described primarily, however, as applied to the sealed drive environment discussed above.

BRIEF DESCRIPTION OF THE DRAWING

The above and other features and objects of the invention will be better understood from the following detailed description of the typical embodiment illustrated in the accompanying drawing, in which:

FIG. 1 is a view partly in elevation and partly in vertical section of a freeze drying unit having a belt drive system embodying the invention;

FIG. 2 is an enlarged fragmentary view taken on the inclined line 2—2 of FIG. 1;

FIG. 2a is an enlarged section taken on line 2a—2a of FIG. 2;

FIG. 3 is a section taken on line 3—3 of FIG. 2;

FIG. 4 is a view taken on lines 4—4 of FIG. 3; and

FIG. 5 is a section taken on lines 5—5 of FIG. 4.

DESCRIPTION OF THE PREFERRED EMBODIMENT

With reference first to FIG. 1, I have illustrated in that figure a freeze drying unit 10 which is very similar to that disclosed and claimed in my above identified copending application Ser. No. 801,411. This unit 10 includes a rigid sealed heat insulated housing or shell 11, having an upstanding portion 12 into which a product to be freeze dried is sprayed downwardly in liquid form by a sprayer 13, to be frozen within upstanding portion 12 into the form of particles which fall downwardly onto the upper run of an endless conveyor belt 14 mounted for horizontal movement by a pair of spaced parallel rollers 15 and 16. Refrigerant fluid flowing within the wall of the upstanding portion 12 of the shell at 16 assures freezing of the liquid to the desired particulate form, while heaters 17 in a horizontally extending cylindrical portion 18 of the shell act to sublime moisture from the particles as they advance leftwardly in FIG. 1 in the upper run of belt 14, to completely dry the particles by the time they are ultimately discharged from the left end of the conveyor into outlet receptacle 19, past a vacuum lock valve diagrammatically represented at 20. The sublimated moisture is drawn from the shell through an outlet 21 by a vacuum pump 22, and through a condensing chamber 23 within which the moisture is condensed.

The belt 14 is driven along its endless path by a rotary electric motor 24 located at the outside of shell 11, through a sealed drive assembly designated generally by the number 25 in FIG. 2, which drive assembly moves the belt almost continuously, and preferably at a rather slow rate of travel calculated to assure complete drying of the particles by the time they reach the discharge end of the conveyor. Motor 24 may be mounted on a suitable support bracket 26 connected to side wall 27 of the shell. The motor has a reduction gear 28, whose output shaft 29 turns about a desirably horizontal axis 30 at a rate substantially less than the rate at which the rotor of the motor 24 itself turns.

Rigidly connected to and driven by shaft 29, there is a rotary crank element 31, desirably taking the form of a disc 32 having a stub shaft 33 projecting therefrom at a location offset eccentrically from axis 30. A rigid elongated connector link 34 is pivotally connected to and driven by stub shaft 33, with the pivotal axis of this connection being designated by the number 35 in FIG. 2, and being offset from and parallel to main rotary axis 30 of the crank device 31. The opposite end of link 34 is pivotally connected at 36 to one end of an oscillatory lever 37 extending through an aperture 38 in side wall 27 of the shell. The pivotal connections 36 and 39 at the opposite ends of link 34 may be of the ball-and-socket type enabling limited universal movement of the connected parts at these joints.

Lever 37 is mounted by a fitting 40 (FIG. 2) to pivot relative to that fitting and wall 27 of the shell about an axis 41. Fitting 40 is essentially tubular, and centered about an axis 42 disposed esentially perpendicular to wall 27 at the location of aperture 38, and has a relatively large diameter portion 33' which is a close fit within aperture 38, and is annularly welded to the wall at 44 in fluid tight sealed relation with respect therto. Projecting outwardly beyond the wall, fitting 40 has an externally reduced diameter and externally cylindrical portion 45, containing an internal cylindrical passage 46 communicating at opposite ends with flaring throats 47 and 48. Lever 37 has a spherical mounting portion 48' which is a close fit within and is located by cylindrical passage 46 in fitting 40, and which carries a pin 49 (FIG. 2a) received within passages 50 in fitting 40 to retain the lever for only the desired pivotal movement about the previously mentioned axis 41.

Near its outer end, lever 37 has an annular enlargement 151, with an outer cylindrical surface 51 centered about the longitudinal axis of the lever and preferably of a diameter the same as that of the outer cylindrical surface 52 of the reduced portion 45 of fitting 40. To form a fluid tight seal between fitting 40 and lever 37, there is provided a flexible tubular fluid impervious seal member 53, which may take the form of a suitable length of flexible hose formed of rubber or resinous plastic material, with this seal element or hose 53 having an internal diameter which is a tight fit on surfaces 51 and 52, and with the hose being clamped tightly and permanently against those surfaces 51 and 52 by two conventional clamp rings 54 and 55. As will be apparent from FIG. 2, seal element 53 is of a length great enough to require only very slight flexure of this element as the lever pivots about its axis 41, as between the full line and broken line positions of FIG. 2. Lever 37 oscillates continuously and pivotally between these two positions as crank element 31 is driven by motor 24, and by virtue of the connection of the crank element and lever 37 through link 34.

At the inside of the shell and its side wall 27, the second end of lever 37 is connected by an essentially pivotal joint 56 to one end of a bifurcated connector link unit 57, which at its opposite end forms two diverging arms or branches 58 and 59 (FIG. 3) extending to locations respectively above and beneath a horizontal shaft 60 (FIGS. 2, 3 and 4) which carries the previously mentioned cylindrical roller 16 about which the discharge end of conveyor belt 14 extends. Roller 16 may be rigidly secured to shaft 60 for rotation therewith, as by webs or discs 62 welded to elements 16 and 60. The shaft 60 is journalled for rotation about horizontal axis 63 by bearings 64 engaging opposite ends of the shaft and carried by a pair of parallel frame members 65 suitably welded to or otherwise retained in fixed position relative to the wall of shell 11. Desirably, bearings 64 are formed of a resinous plastic material which will journal the shaft for the desired rotation without lubrication and without substantial wear of the bearings in use. For this purpose, nylon bearings are considered most desirable.

Laterally beyond one of the bearings 64 (beyond the right-hand bearing as viewed in FIG. 2), two one-way clutches 66 and 67 are carried about the shaft 60, for transmitting motion from the two arms 58 and 59 of link unit 57 to the shaft. These two one-way clutches may take any of various different forms, and may typically be identical in construction. More specifically, each of the clutches is adapted to drive the shaft in a clockwise direction as viewed in FIG. 3, but will not drive the shaft in the reverse or counterclockwise direction.

To describe briefly one typical known type of clutch which may be used at 66, and with reference particularly to FIGS. 4 and 5, it is noted that clutch 66 may include a first section 68 connected rigidly to shaft 60 to rotate the latter, and a second section 69 disposed about and rotatable relative to section 68. The section 68 may include two parts 70 and 71 threadedly connected together at 72 and a third disc-like part 171 clamped between parts 70 and 71 and keyed to these parts at 27' for rotation therewith. The three parts 70, 71 and 171 define together an annular groove 73 within which the radially inner portion of outer section 69 is confined for relative rotary movement. A series of spaced rollers or clutching elements 76 are psitioned movably within individual camming notches formed in the periphery of element 171, and act to transmit rotary motion about axis 63 from section 69 to element 171 and the shaft, in a clockwise direction as viewed in FIG. 5, but not in the reverse direction. That is, if section 69 is moved in a counterclockwise direction, rollers 76 allow that section to turn in the specified direction without causing corresponding rotary motion of the shaft, whereas upon movement of section 69 in a clockwise direction the rollers are wedged tightly radially between the cam surfaces 371 on element 171 and the inner surface of part 69 to transmit the rotary motion to the shaft. Section 69 has an upwardly projecting ear or portion 77 to which the end of arm 58 of link unit 57 (FIGS. 3, 4 and 5) is secured by a pivotal connection 78.

As indicated previously, the second clutch unit 67 may be identical with the above discussed clutch unit 66. However, the section 69' of unit 67 (corresponding to section 69 of unit 66) has its ear or projection 77' (corresponding to ear 77 of section 69) projecting downwardly rather than upwardly, and secured to the end of arm 59 of link unit 57 by a pivotal connection 78'. All of the three pivotal connections 56, 78 and 78' may be of the same ball-and-socket type as the previously discussed connections 36 and 39 at the outside of the shell, to allow for slight universal motion at the various connections as required in order to enable the desired oscillatory movement of lever 37 and the required movements of the connected parts.

To describe now the overall operation of the illustrated sealed drive system of the invention, assume that the freeze drying apparatus is all functioning, and that frozen particles are being delivered onto the upper surface of conveyor belt 14, and being dried by heaters 17 as they advance to the left in FIG. 1, all under high vacuum conditions. To drive the belt through roller 16, motor 24 at the outside of the housing or shell 11 operates continuously, and acts through reduction gear unit 28 to drive rotary crank element or disc 31 continuously about axis 30 at a relatively slow speed, say for example between about 1 and 70 revolutions a minute, typically in a currently preferred installation at about 1¾ revolutions a minute. As element 31 turns about its axis, it acts through link 34 of FIG. 2 to actuate lever 37 pivotally about axis 41, alternately in opposite directions and between the full line and broken line positions of FIG. 2. The oscillatory pivotal movement of lever 37 is transmitted at the inside of the shell wall 27 into oscillatory bodily movement of bifurcated link unit 57 between its broken line and full line positions of FIG. 3, to actuate the sections 69 and 69' of the two one-way clutches 66 and 67 first to the right in FIG. 3, then to the left in FIG. 3, then again to the right in FIG. 3, etc., between the full line and broken line positions of FIG. 3. Each time that unit 57 moves to the right in FIG. 3, clutch unit 66 acts to drive shaft 60 in a clockwise direction, while clutch 67 is ineffective to transmit motion of any type to the shaft. On the reverse or leftward movement of link unit 57, clutch 67 acts to drive the shaft 60 in a clockwise direction (as viewed in FIG. 3), while the clutch unit 66 is in its returning condition in which it is ineffective to transmit power of any type to the shaft. Thus, arm 58 and clutch 66 act on each rightward stroke to turn the shaft and roller in a clockwise direction, while arm 59 and clutch 67 act on each returning leftward stroke to drive the shaft in the same clockwise rotary direction, so that the shaft and connected roller 16 are both driven substantially continuously about axis 63, to correspondingly drive the conveyor belt 14 substantially continually, but at a very slow rate, preferably between about ¼ of an inch and 18 inches per minute, and in one typical presently preferred arrangement about ⅜ of an inch per minute.

In this way, the belt is driven very effectively and positively, by a motor which is located entirely at the outside of the shell and cannot be affected in any way by the high vacuum conditions within the shell, and yet with the drive between the rotary motor and the rotary roller at the inside of the shell being completely sealed at the location at which the drive passes through wall 27 of the shell, and without the necessity for sealing any rotary shaft or other continuously rotating element passing through the wall.

While a certain specific embodiment of the present invention has been disclosed as typical, the invention is of course not limited to this particular form, but rather is applicable broadly to all such variations as fall within the scope of the appended claims.

I claim:

1. A sealed drive system comprising a wall structure separating two noncommunicating spaces and containing an opening, a lever extending through said opening, and mounted for oscillatory pivotal movement in opposite directions relative to said wall structure, a motor assembly having a rotary output element power driven rotatively about an axis at a first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, an essentially tubular fitting connected into said opening in the wall structure and disposed about said lever and to which the lever is pivotally connected, and seal means forming a fluid tight seal between said oscillatory lever and said wall structure and including a flexible tubular seal element disposed about said lever and sealed at spaced locations with respect to said fitting and said lever.

2. A sealed drive system comprising a wall structure separating two noncommunicating spaces and containing an opening, a lever extending through said opening, and mounted for oscillatory pivotal movement in opposite directions relative to said wall structure, a motor assembly having a rotary output element power driven rotatively about an axis at a first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, an essentially tubular fitting connected into said opening in the wall structure and disposed about said lever and to which the lever is pivotally connected and having a portion projecting at one side of said wall structure, said lever having an enlargement spaced from said portion of said fitting at said one side of the wall structure, and seal means forming a fluid tight seal between said oscillatory lever and said wall structure and including a flexible tube disposed about said lever at said one side of the wall structure and having portions near its opposite ends disposed about and sealed with respect to said portion of said fitting and said enlargement on the lever respectively.

3. A sealed drive system comprising a wall structure separating two noncommunicating spaces and containing an opening, a lever extending through said opening, and mounted for oscillatory pivotal movement in opposite directions relative to said wall structure, a motor assembly having a rotary output element power driven rotatively about an axis at a first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, and seal means forming a fluid tight seal between said oscillatory lever and said wall structure, said first drive connection including a link pivotally connected toward a first end thereof to said first mentioned rotary element at a location offset essentially from its axis and pivotally connected toward a second end to said lever at said first side of the wall structure to oscillate the lever in response to rotation of said rotary element.

4. A sealed drive system comprising a wall structure separating two noncommunicating spaces and containing an opening, a lever extending through said opening, and mouted for oscillatory pivotal movement in opposite directions relative to said wall structure, a motor assembly having a rotary output element power driven rotatively about an axis at the first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, and seal means forming a fluid tight seal between said oscillatory lever and said wall structure, said second drive connection including a one-way drive acting to turn said second rotary element in a predetermined rotary direction upon pivotal movement of said lever in a first direction but ineffective to turn the rotary element in either rotary direction upon reverse pivotal movement of the lever.

5. A sealed drive system comprising a wall structure separating two noncommunicating spaces and containing an opening, a lever extending through said opening, and mounted for oscillatory pivotal movement in opposite directions relative to said wall structure, a motor assembly having a rotary output element power driven rotatively about an axis at a first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, and seal means forming a fluid tight seal between said oscillatory lever and said wall structure, said second drive connection including a first one-way drive acting to turn said second rotary element in a predetermined rotary direction upon pivotal movement of the lever in a first direction but ineffective to turn the second rotary element upon pivotal movement of the lever in the opposite direction, and a second one-way drive acting to turn said second rotary element in said predetermined rotary direction upon pivotal movement of the lever in said opposite direction but ineffective to turn the second rotary element upon pivotal movement of the lever in said first direction.

6. A sealed drive system as recited in claim 5, in which said first drive connection includes a link pivotally connected toward a first end thereof to said first mentioned rotary element at a location offset essentially from its axis and pivotally connected toward a second end to said lever at said first side of the wall structure to oscillate the lever in response to rotation of said first rotary element.

7. A sealed drive system as recited in claim 6, including an endless belt at said second side of the wall structure driven by said second rotary element.

8. A sealed drive system comprising a wall structure separating two noncommunicating spaces and containing an opening, a lever extending through said opening, and mounted for oscillatory pivotal movement in opposite directions relative to said wall structure, a motor assembly having a rotary output element power driven rotatively about an axis at a first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, seal means forming a fluid tight seal between said oscillatory lever and said wall structure, and an endless belt at said second side of the wall structure driven by said second rotary element.

9. A drive system as recited in claim 5, in which said two one-day drives include two one-way rotary clutches both operable to drive said second rotary element about its axis in said predetermined rotary direction but not the reverse direction, and means connecting said lever to said clutches at opposite sides respectively of said axis of the second rotary element to drive said second rotary element only in said predetermined direction upon movement of said lever in its opposite directions.

10. A drive system as recited in claim 5, in which said second rotary element is a shaft, said one-way drives including two one-way rotary clutches disposed about said shaft and both operable to drive said shaft about its axis in said predetermined rotary direction but not the reverse direction, and two members interconnected for oscillatory movement together and connected at first ends to said lever for oscillation therewith, said members being connected at second ends thereof to said two clutches respectively, at opposite sides respectively of said shaft, to drive the shaft only in said predetermined direction upon movement of said first structure in its opposite directions.

11. A sealed drive system comprising a wall structure separating two noncommunicating spaces and containing an opening, a lever extending through said opening, and mounted for oscillatory pivotal movement about an axis in opposite directions relative to said wall structure, a motor assembly having a rotary output element power driven rotatively about an axis at a first side of said wall structure, a first drive connection from said rotary element to said lever at said first side of the wall structure for oscillating said lever pivotally in said opposite directions in response to rotation of said element, a second rotary element at the second side of said wall structure, a second drive connection at said second side of the wall structure and between said lever and said second rotary element for driving the latter rotatively in response to said oscillatory pivotal movement of the lever, and a flexible tubular seal element disposed about said lever and forming a fluid tight seal between said lever and said wall structure, said flexible tubular element being sealed with respect to said wall structure at a first location, and being sealed to said lever at a second location which is spaced farther than said first location from the pivotal axis of the lever, in a direction longitudinally of the lever.

12. A sealed drive system as recited in claim 11 including two annular clamps securing said tubular element to said wall structure and lever at said two locations respectively.

13. A sealed drive system as recited in claim in which said tubular element is sealed with respect to the wall structure essentially within a plane containing said pivotal axis of the lever.

14. A sealed drive system as recited in claim 4, in which said one-way drive includes a rotary one-way clutch operbale to drive said second rotary element in only said predetermined direction, and a link structure connected at one end to said lever and at an opposite end to said rotary clutch to oscillate the clutch rotatively in response to pivotal oscillation of the lever.

References Cited

UNITED STATES PATENTS

| 657,680 | 9/1900 | Shaw | 74—561 |
| 813,757 | 2/1906 | Wihlborg | 74—143 |
| 1,562,798 | 11/1925 | Skalka | 74—126 |
| 1,760,636 | 5/1930 | Fortune et al. | 74—18.1 |
| 3,033,046 | 5/1962 | Rodda | 74—18.1 |

FRED C. MATTERN, Jr., Primary Examiner

F. D. SHOEMAKER, Assistant Examiner

U.S. Cl. X.R.

74—125.5; 192—48.92